United States Patent
Covello et al.

(10) Patent No.: US 12,554,429 B2
(45) Date of Patent: Feb. 17, 2026

(54) CROSS-COMPARISON OF DATA COPY PAIRS DURING MEMORY DEVICE INITIALIZATION

(71) Applicant: Micron Technology, Inc., Boise, ID (US)

(72) Inventors: Angelo Covello, Avezzano AQ (IT); Claudia Ciaschi, Latina LT (IT); Michele Incarnati, Avezzano (IT); Tommaso Vali, Sezze LT (IT)

(73) Assignee: Micron Technology, Inc., Boise, ID (US)

( * ) Notice: Subject to any disclaimer, the term of this patent is extended or adjusted under 35 U.S.C. 154(b) by 126 days.

(21) Appl. No.: 18/509,587

(22) Filed: Nov. 15, 2023

(65) Prior Publication Data
US 2024/0231670 A1    Jul. 11, 2024

Related U.S. Application Data

(60) Provisional application No. 63/437,797, filed on Jan. 9, 2023.

(51) Int. Cl.
*G06F 3/06* (2006.01)
*G06F 11/10* (2006.01)

(52) U.S. Cl.
CPC ............ *G06F 3/065* (2013.01); *G06F 3/0619* (2013.01); *G06F 11/1048* (2013.01); *G06F 3/0679* (2013.01)

(58) Field of Classification Search
CPC ...... G06F 3/065; G06F 3/0619; G06F 3/0679; G06F 11/1048
See application file for complete search history.

(56) References Cited

U.S. PATENT DOCUMENTS 9,703,629 B2 * 7/2017 Desireddi .............. G11C 29/42

* cited by examiner

*Primary Examiner* — Kalpit Parikh
(74) *Attorney, Agent, or Firm* — Lowenstein Sandler LLP

(57) ABSTRACT

A memory device includes a local memory to store operational data and comparison logic operatively coupled with the local memory. The comparison logic, upon initialization of the memory device, compares, to detect any errors in the operational data, one copy of a first copy pair with one copy of a second copy pair of the operational data, the first copy pair including a first copy and an inverted first copy and the second copy pair including a second copy and an inverted second copy of the operational data. The comparison logic further reports an error in response to detecting the first copy pair does not match the second copy pair.

20 Claims, 10 Drawing Sheets

CROSS-COMPARISON OF DATA COPY PAIRS DURING MEMORY DEVICE INITIALIZATION

CLAIM OF PRIORITY

The present application claims the benefit under 35 U.S.C. § 119(e) of U.S. Provisional Patent Application No. 63/437,797 filed Jan. 9, 2023, which is incorporated by reference herein.

TECHNICAL FIELD

Embodiments of the disclosure relate generally to memory sub-systems, and more cross-comparison of data copy pairs during memory device initialization.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1A:
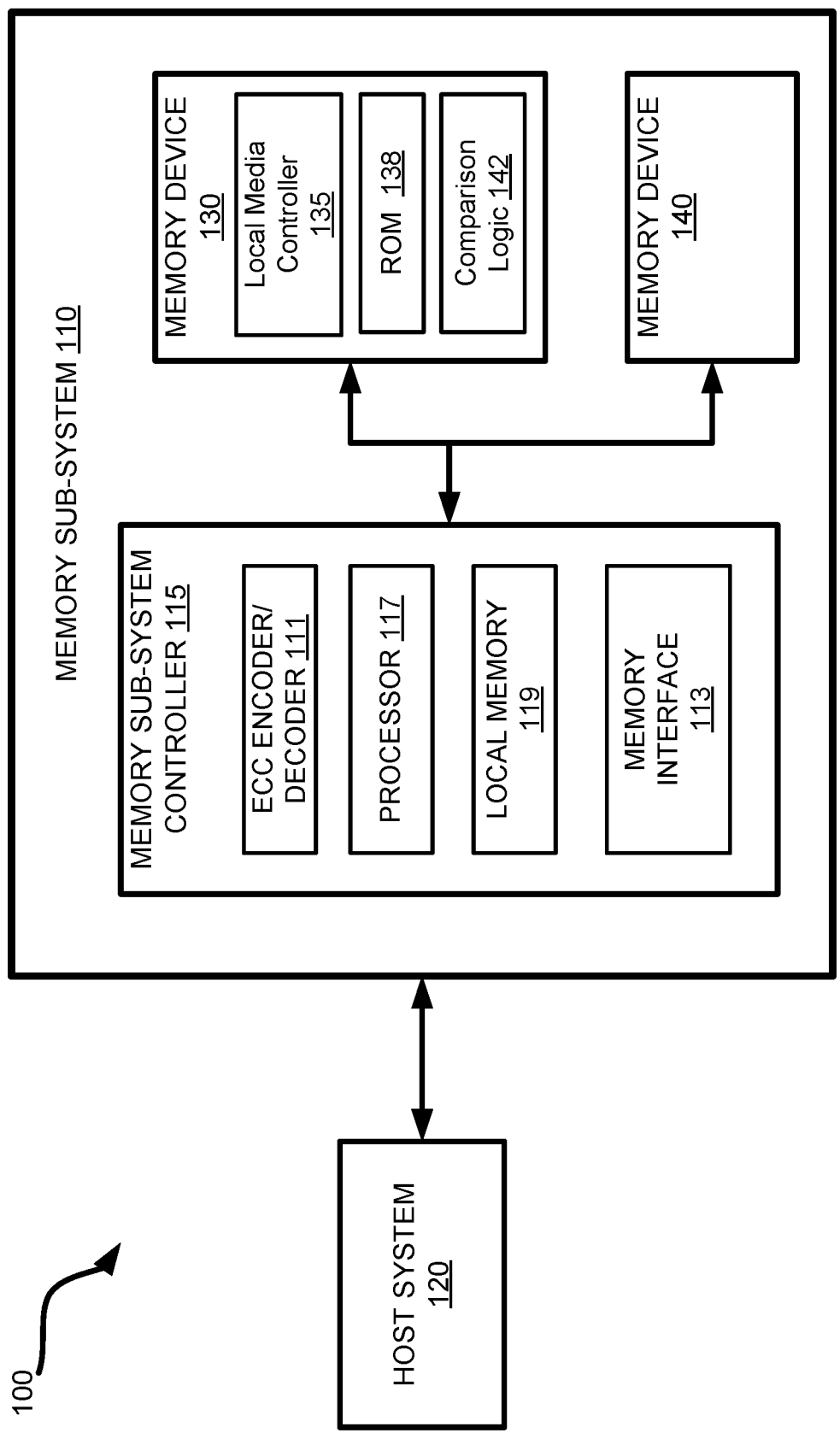
FIG. 1A illustrates an example computing system that includes a memory sub-system according to embodiments.

Aspects of the present disclosure are directed to cross-comparison of data copy pairs during memory device initialization. A memory sub-system can be a storage device, a memory module, or a hybrid of a storage device and memory module. Examples of storage devices and memory modules are described below in conjunction with FIG. 1A. In general, a host system can utilize a memory sub-system that includes one or more components, such as memory devices that store data. The host system can provide data to be stored at the memory sub-system and can request data to be retrieved from the memory sub-system.

The memory devices can be non-volatile memory devices that can store data from the host system. One example of a non-volatile memory device is a NOT-AND (NAND) memory device. Other examples of non-volatile memory devices are described below in conjunction with FIG. 1. Each of the memory devices can include one or more arrays of memory cells that are organized in physical blocks of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1," or combinations of such values.

A NAND memory device, also sometimes referred to as NAND flash memory, employs circuitry that allows proper initialization of the memory device at power-on, sometimes referred to as power-on reset (POR). The circuitry may be configured to initialize the memory device with a probability of error in operational data lower than 20 defects per million (dpm), although stricter probabilities of error are expected in the future. For example, operational data is usually read out of a read only memory (ROM) of the memory device, and after some error checking, is loaded into a local media controller that controls the operation of the memory device. Bad initialization of the memory device leads to a wrong operational data being loaded and the memory device not working as expected, e.g., device or system errors. Systems require continuous improvement in performances, therefore requiring safe areas where data can be stored with low probability of failure.

In certain memory devices, such as certain NAND or NAND flash devices, techniques are employed to detect errors (or likely errors) in stored data, therefore avoiding wrong operational data being loaded. One such technique is a copy/copy_ (or copy/copy bar) method in which a copy of the data is compared with an inverted copy of the data to determine whether the data has an error. This methodology, however, is limited by its inability to detect silent errors (SE) that are non-detectable errors. So-called silent errors occur when two bits are in error in the same position, e.g., a position being compared across copy and inverted copy of the data. These silent errors are the main source of bad initialization of the device due to loading the wrong operational data into the memory device, e.g., into the local media controller. Further, employing the copy/copy_ comparison methodology does not benefit from comparing more than three copies.

$$\frac{PASS}{FAIL} = (C_i \; XOR \; \overline{C_i}) \; AND \; (C_j \; XOR \; \overline{C_j}) \; AND \; (C_i \; XOR \; \overline{C_j}) \quad (1)$$

Aspects of the present disclosure address the above and other deficiencies of the copy/copy_ method that compares copy pairs of operational data (e.g., C1/C1_, C2/C2_, . . . Cn/Cn_) and that includes a cross-comparison between such copy pairs of the operational data. For example, one possible implementation is illustrated in Equation (1), where the variables i and j are integers (e.g., from 1 . . . 8 or some other range of integers). In one example, and for purposes of ease of explanation, i is "1" and j is "2." Thus, in this example, while C1 is compared to C1_ and C2 is compared to C2_, C1 is also compared with C2_. This latter comparison is a cross-comparison. In other embodiments, the cross-comparison is performed between C1_ and C2. In other embodiments, the cross comparison may be performed between C1 and C2, where the logic varies between embodiments in performing these comparison, as will be discussed. Thus, there is a variety of possible implementations of cross-comparisons, which will be further discussed by of example herein.

In at least some embodiments, comparison logic is configured to compare, to detect any errors in the operational data, one copy of a first copy pair (Ci, Ci_) with one copy of a second copy pair (Cj, Cj_) of the operational data, which is the cross-comparison between the copy pairs. Thus, the first copy pair may include a first copy (Ci) and an inverted first copy (Ci_) and the second copy pair may include a second copy (Cj) and an inverted second copy (Cj) of the operational data. The comparison logic can further be configured to report an error in response to detecting the first copy pair does not match the second copy pair based on the comparisons that include a cross-comparison between copy pairs. The comparison logic can trigger loading the operational data into a local media controller of the memory device in response to detecting the first copy pair match the second copy pair, for example.

Advantages of the present disclosure include but are not limited to significantly reducing the probability of device failure (and a corresponding reduction in probability of memory sub-system failure) due to silent errors in operational data that is loaded, e.g., into a controller of the memory device. As will be discussed, the cross-comparison does not require generation of further copy/copy_ pairs and various architectural embodiments adds only minimum additional processing logic (to include logic hardware), which adds comparatively additional chip area. Much of the existing circuitry for implementing such comparison logic already exists and is reusable within the disclosed designs. These and other advantages will be discussed hereinafter, as would be apparent to those skilled in the art of memory device initialization configuration and management.

FIG. 1A illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such. Each memory device 130 or 140 can be one or more memory component(s).

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IOT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1A illustrates one example of a host system 120 coupled to one memory sub-system 110. As used herein, "coupled to" or "coupled with" generally refers to a connection between components or devices, which can be an indirect communicative connection or direct communicative connection (e.g., without intervening components or devices), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface, which can communicate over a system bus. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1A illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include NOT-AND (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of MLC memory cells, such as bi-level cells (BLCs), triple-level cells (TLCs), quad-level cells (QLCs), and penta-level cells (PLCs) can store multiple bits per cell. In some embodiments, each of the memory devices 130 can include one or more arrays of memory cells such as SLCs, BLCs, TLCs, QLCs, PLCs or any combination of such. In some embodiments, a particular memory device can include an SLC portion, and an BLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), NOT-OR (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1A has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, the memory devices 130 are managed memory devices, which is a raw memory device combined with a local controller (e.g., the local media controller 135) for memory management within the same memory device package or memory die. An example of a managed memory device is a managed NAND (MNAND) device. Memory device 130, for example, can represent a single die or multiple dice having some control logic (e.g., local media controller 135) embodied thereon. In some embodiments, one or more components of the memory sub-system 110 are omitted.

In some embodiments, the controller 115 includes an error-correcting code (ECC) encoder/decoder 111. The ECC encoder/decoder 111 can perform ECC encoding for data written to the memory devices 130 and ECC decoding for data read from the memory devices 130, respectively. The ECC decoding can be performed to decode an ECC codeword to correct errors in the raw read data, and in many cases also to report the number of bit errors in the raw read data.

In various embodiments, the controller 115 includes a memory interface component 113. The memory interface component 113 is responsible for handling interactions of the memory sub-system controller 115 with the memory devices of the memory sub-system 110, such as the memory device 130. For example, the memory interface component 113 can send memory access commands corresponding to requests received from the host system 120 to the memory device 130, such as program commands, read commands, or other commands. In addition, the memory interface component 113 can receive data from the memory device 130, such as data retrieved in response to a read command or a confirmation that a program command was successfully performed. In some embodiments, the memory sub-system controller 115 includes at least a portion of the memory interface 113. For example, the controller 115 can include a processor 117 (e.g., a processing device) configured to execute instructions stored in the local memory 119 for performing the operations described herein. In some embodiments, the memory interface component 113 is part of the host system 120, an application, or an operating system.

In some embodiments, the memory device 130 includes the local media controller 135, a read only memory (ROM) 138 or other local memory that stores operational data, and comparison logic 142. In some embodiments, the comparison logic 142 is included in the local media controller 135. In at least some embodiments, the comparison logic 142 is configured to read operational data from the ROM 138 and perform a comparison of the operational data. In these embodiments, if the comparison checks of copy/copy_ pairs (to include a cross-comparison) of the operational data pass, the comparison logic 142 triggers the operational data (that has passed the check) to be loaded into the local media controller 135 for operational control of the memory device 130.

Figure 1B:
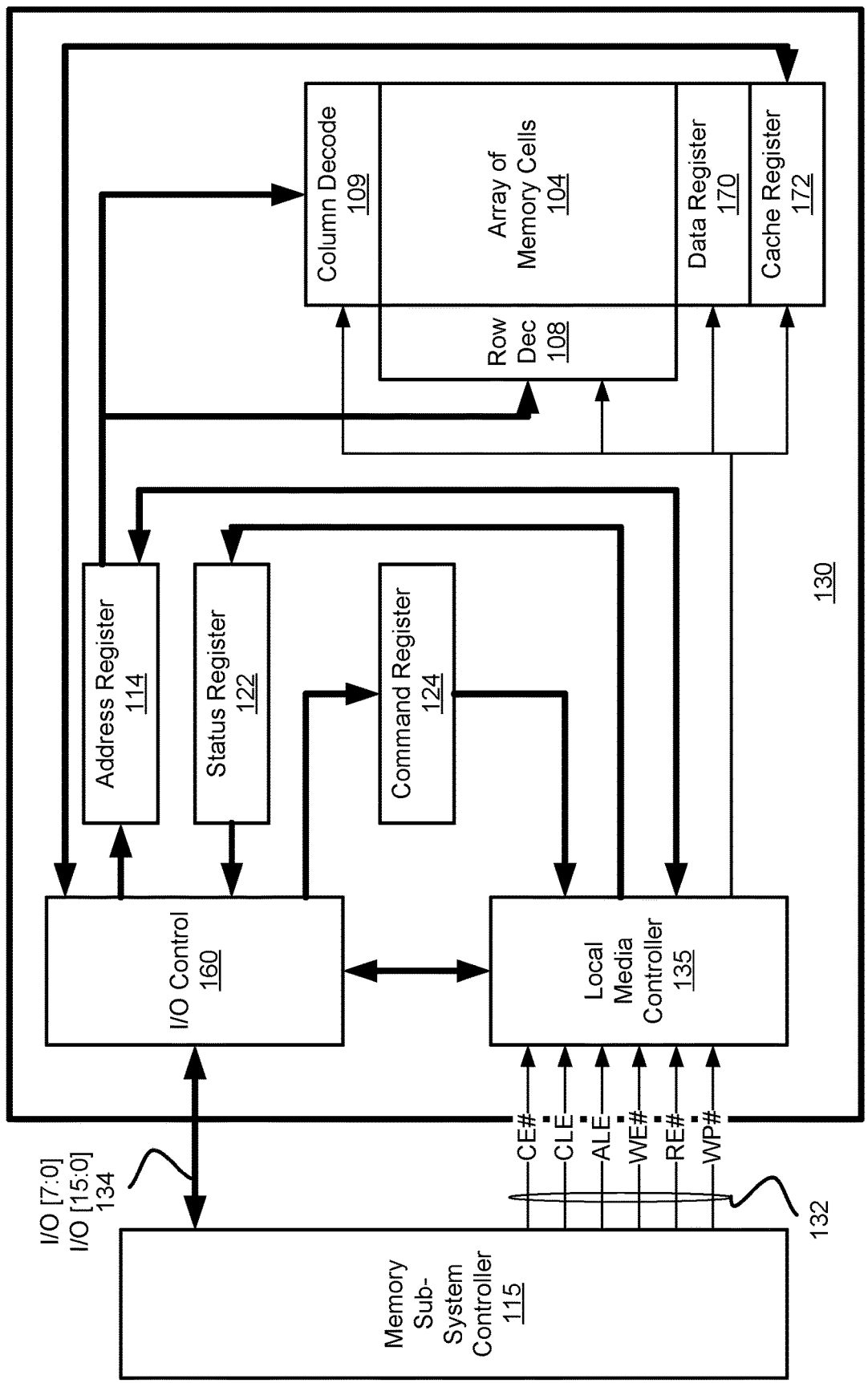
FIG. 1B is a block diagram of a memory device in communication with a memory sub-system controller of a memory sub-system, in accordance with some embodiments.

FIG. 1B is a simplified block diagram of a first apparatus, in the form of a memory device 130, in communication with a second apparatus, in the form of a memory sub-system controller 115 of a memory sub-system (e.g., memory sub-system 110 of FIG. 1A), according to an embodiment. Some examples of electronic systems include personal computers, personal digital assistants (PDAs), digital cameras, digital media players, digital recorders, games, appliances, vehicles, wireless devices, mobile telephones and the like. The memory sub-system controller 115 (e.g., a controller external to the memory device 130), may be a memory controller or other external host device.

Memory device 130 includes an array of memory cells 104 logically arranged in rows and columns. Memory cells of a logical row are typically connected to the same access line (e.g., a wordline) while memory cells of a logical column are typically selectively connected to the same data line (e.g., a bit line). A single access line may be associated with more than one logical row of memory cells and a single data line may be associated with more than one logical column. Memory cells (not shown in FIG. 1B) of at least a portion of array of memory cells 104 are capable of being programmed to one of at least two target data states.

Row decode circuitry 108 and column decode circuitry 109 are provided to decode address signals. Address signals are received and decoded to access the array of memory cells 104. Memory device 130 also includes input/output (I/O) control circuitry 160 to manage input of commands, addresses and data to the memory device 130 as well as output of data and status information from the memory device 130. An address register 114 is in communication with I/O control circuitry 160 and row decode circuitry 108 and column decode circuitry 109 to latch the address signals prior to decoding. A command register 124 is in communication with I/O control circuitry 160 and local media controller 135 to latch incoming commands.

A controller (e.g., the local media controller 135 internal to the memory device 130) controls access to the array of memory cells 104 in response to the commands and generates status information for the external memory sub-system controller 115, i.e., the local media controller 135 is configured to perform access operations (e.g., read operations, programming operations and/or erase operations) on the array of memory cells 104. The local media controller 135 is in communication with row decode circuitry 108 and column decode circuitry 109 to control the row decode circuitry 108 and column decode circuitry 109 in response to the addresses. In one embodiment, local media controller 135 can perform a double single-level cell (SLC) program operation to concurrently (i.e., at least partially overlapping in time) program memory cells in two or more separate sub-blocks of a block of memory array 104 using a single programming pulse.

The local media controller 135 is also in communication with a cache register 172. Cache register 172 latches data, either incoming or outgoing, as directed by the local media controller 135 to temporarily store data while the array of memory cells 104 is busy writing or reading, respectively, other data. During a program operation (e.g., write operation), data may be passed from the cache register 172 to the data register 170 for transfer to the array of memory cells 104; then new data may be latched in the cache register 172 from the I/O control circuitry 160. During a read operation, data may be passed from the cache register 172 to the I/O control circuitry 160 for output to the memory sub-system controller 115; then new data may be passed from the data register 170 to the cache register 172. The cache register 172 and/or the data register 170 may form (e.g., may form a portion of) a page buffer of the memory device 130. A page buffer may further include sensing devices (not shown in FIG. 1B) to sense a data state of a memory cell of the array of memory cells 104, e.g., by sensing a state of a data line connected to that memory cell. A status register 122 may be in communication with I/O control circuitry 160 and the local memory controller 135 to latch the status information for output to the memory sub-system controller 115.

Memory device 130 receives control signals at the memory sub-system controller 115 from the local media controller 135 over a control link 132. For example, the control signals can include a chip enable signal CE #, a command latch enable signal CLE, an address latch enable signal ALE, a write enable signal WE #, a read enable signal RE #, and a write protect signal WP #. Additional or alternative control signals (not shown) may be further received over control link 132 depending upon the nature of the memory device 130. In one embodiment, memory device 130 receives command signals (which represent commands), address signals (which represent addresses), and data signals (which represent data) from the memory sub-system controller 115 over a multiplexed input/output (I/O) bus 134 and outputs data to the memory sub-system controller 115 over I/O bus 134.

For example, the commands may be received over input/output (I/O) pins [7:0] of I/O bus 134 at I/O control circuitry 160 and may then be written into command register 124. The addresses may be received over input/output (I/O) pins [7:0] of I/O bus 134 at I/O control circuitry 160 and may then be written into address register 114. The data may be received over input/output (I/O) pins [7:0] for an 8-bit device or input/output (I/O) pins [15:0] for a 16-bit device at I/O control circuitry 160 and then may be written into cache register 172. The data may be subsequently written into data register 170 for programming the array of memory cells 104.

In an embodiment, cache register 172 may be omitted, and the data may be written directly into data register 170. Data may also be output over input/output (I/O) pins [7:0] for an 8-bit device or input/output (I/O) pins [15:0] for a 16-bit device. Although reference may be made to I/O pins, they may include any conductive node providing for electrical connection to the memory device 130 by an external device (e.g., the memory sub-system controller 115), such as conductive pads or conductive bumps as are commonly used.

It will be appreciated by those skilled in the art that additional circuitry and signals can be provided, and that the memory device 130 of FIG. 1B has been simplified. It should be recognized that the functionality of the various block components described with reference to FIG. 1B may not necessarily be segregated to distinct components or component portions of an integrated circuit device. For example, a single component or component portion of an integrated circuit device could be adapted to perform the functionality of more than one block component of FIG. 1B. Alternatively, one or more components or component portions of an integrated circuit device could be combined to perform the functionality of a single block component of FIG. 1B. Additionally, while specific I/O pins are described in accordance with popular conventions for receipt and output of the various signals, it is noted that other combinations or numbers of I/O pins (or other I/O node structures) may be used in the various embodiments.

Figure 2:
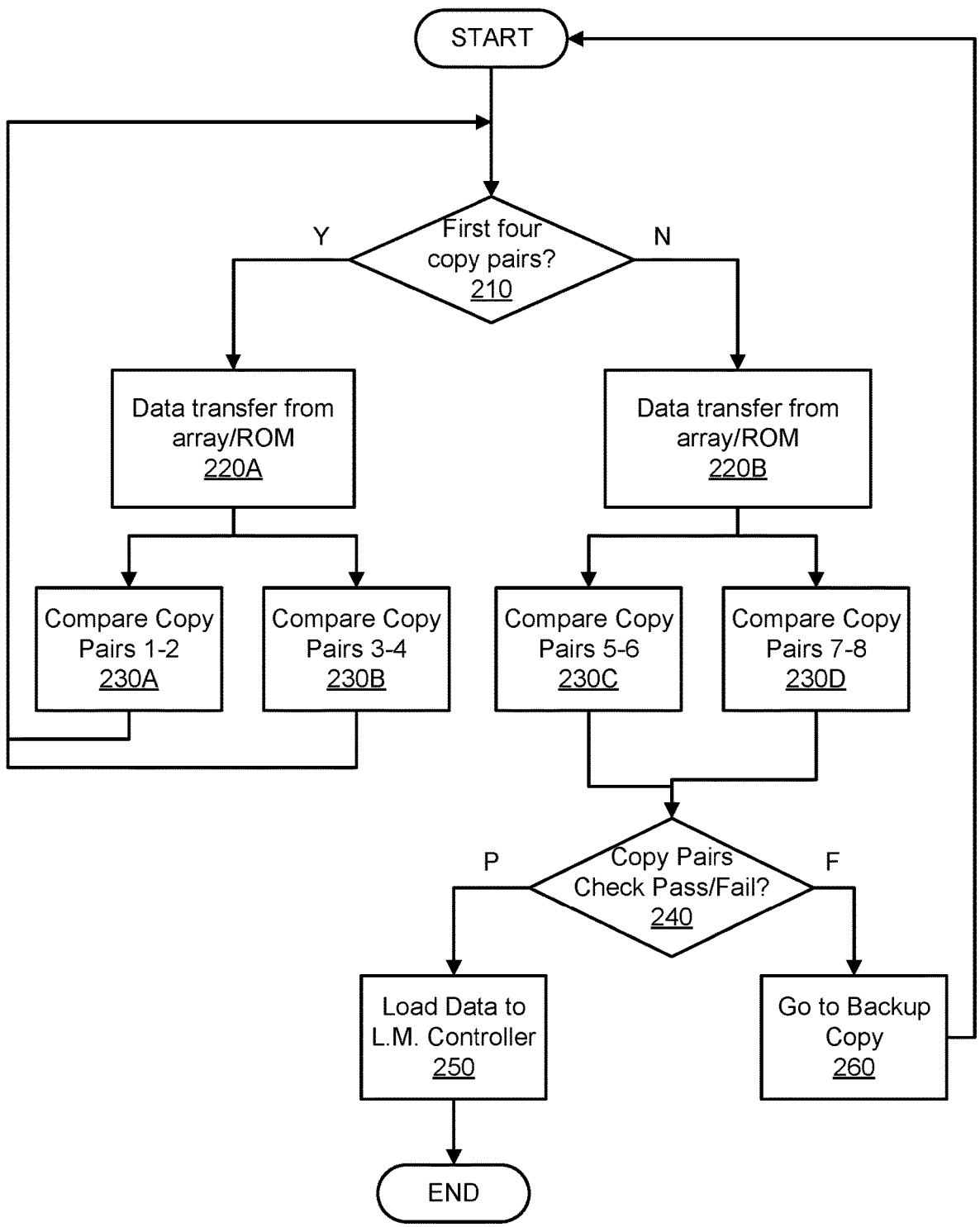
FIG. 2 is a flow chart of a method for cross-comparing data copy pairs according to various embodiments.

FIG. 2 is a flow chart of a method 200 for cross-comparing data copy pairs according to various embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the comparison logic 142 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 210, copy pairs are assessed. More specifically, the processing logic determines whether the copy pairs are the first four of the copy pairs stored in relation to the operational data.

At operation 220A, data is transferred from a data array. More specifically, the processing logic transfers a portion of operational data being checked from the ROM 138.

At operation 230A, copy pairs one and two are checked. More specifically, the processing logic compares a first copy pair (e.g., C1 and C1_) and a second copy pair (e.g., C2 and C2_), as was previously discussed. In disclosed embodiments, each comparison between copy pairs includes a cross-check between a copy of each of the copy pairs, e.g., comparing C1 and C2_, C1_ and C2, or C1 and C2. In one embodiment, for purposes of explanation, copy pairs one and two include <31:0> bits of 64-bit data.

At operation 230B, copy pairs three and four are checked. More specifically, the processing logic compares a third copy pair (C3 and C3_) and a fourth copy pair (C4 and C4_). In disclosed embodiments, each comparison between copy pairs includes a cross-check between a copy of each of the copy pairs, e.g., comparing C3 and C4_, C3_ and C4, or C3 and C4. In one embodiment, for purposes of explanation, copy pairs three and four include <64:32> bits of 64-bit data.

At operation 220B, additional data is transferred from the data array. More specifically, in response to, at operation 210, determining that the first four copy pairs of the operational have already been transferred (and checked), the processing logic transfers additional copy pairs to be further checked. In the disclosed embodiment, the second four copy pairs are the last of eight copy pairs generated for purposes of performing the copy/copy_ error checking.

At operation 230C, copy pairs five and six are checked. More specifically, the processing logic compares a fifth copy pair (C5 and C5_) and a sixth copy pair (C6 and C6_). In disclosed embodiments, each comparison between copy pairs includes a cross-check between a copy of each of the copy pairs, e.g., comparing C5 and C6_, C5_ and C6, or C5 and C6. In one embodiment, for purposes of explanation, copy pairs three and four include <31:0> bits of 64-bit data.

At operation 230D, copy pairs seven and eight are checked. More specifically, the processing logic compares a seventh copy pair (C7 and C7_) and a sixth copy pair (C8 and C8_). In disclosed embodiments, each comparison between copy pairs includes a cross-check between a copy of each of the copy pairs, e.g., comparing C7 and C8_, C7_ and C8, or C7 and C8. In one embodiment, for purposes of explanation, copy pairs seven and eight include <64:32> bits of 64-bit data.

At operation 240, a pass/fail determination is made. More specifically, the processing logic determines whether a check of sets of copy pairs (at operations 230A-230B or at operations 230C-230D), including the cross-checks of these copy pairs of operational data, have passed or failed.

At operation 250, passed operational data is loaded. More, specifically, in response to the copy pairs comparison at any of operations 230A-230D passing, the processing logic loads the operational data (used to generate the copy pairs one through eight) into the local media controller 135. So, for example, if copy pairs one and two pass, then C2 can be loaded, if copy pairs three and four pass, then C4 can be loaded, if copy pairs five and six pass, then C6 can be loaded, and if copy pairs seven and eight pass, then C8 can be loaded.

At operation 260, a backup copy is loaded. More specifically, in response to a copy pair comparison at operations 230A-230D failing, then a backup copy of the copy pairs of operational data can be retrieved and employed in a new check by performing the method 200 again on the backup copy pairs.

Figure 3A:
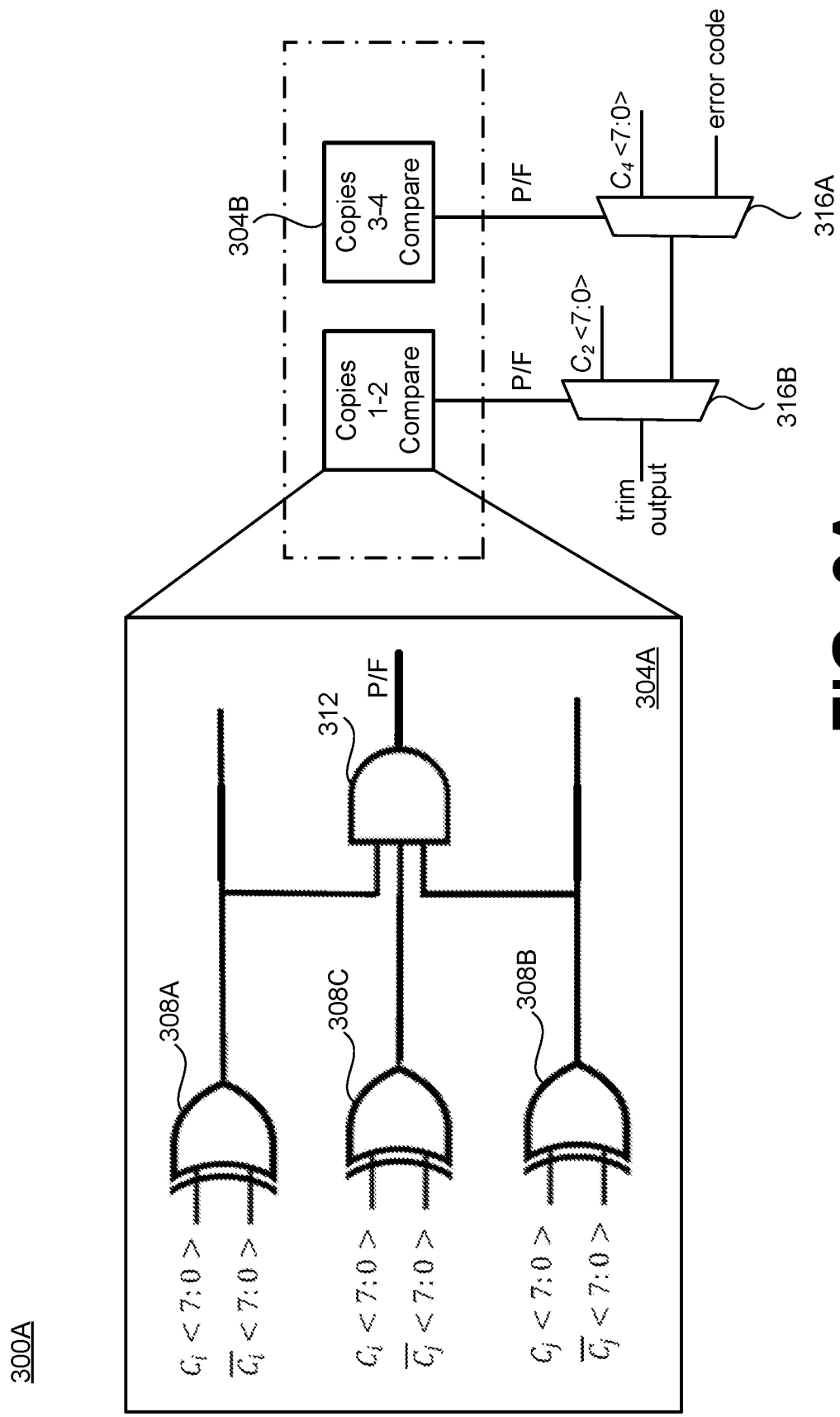
FIG. 3A is a block diagram of comparison logic for comparing copy pairs of operational data including cross-comparing between the copy pairs according to an embodiment.

FIG. 3A is a block diagram of comparison logic 300A for comparing copy pairs of operational data including cross-comparing between the copy pairs according to an embodiment. In some embodiments, the comparison logic 300A is included in the comparison logic 142 (FIG. 1A). The comparison logic 300A, for example, may include a first set of logic gates 304A to compare a first set of copy pairs (e.g., copy pair one and copy pair two) to each other and a second set of logic gates 304B to compare a second set of copy pairs (e.g., copy pair three and copy pair four). Of course, the comparison logic can be duplicated to compare the other four copy pairs, as was illustrated and discussed with reference to FIG. 2.

By way of example, just the first set of logic gates 304A is explained in detail. In some embodiments, the first set of logic gates 304A includes a first exclusive OR (XOR) gate 308A to compare a first copy pair (Ci/Ci_) and a second XOR gate 308B to compare a second copy pair (Cj/Cj_). Thus, if each copy pair is not a complement in data (and thus reflect matching data copies), the XOR gate will assert an output indicating a compare (or check) failure. By way of example, the first copy pair includes a first copy (C1) and an inverted first copy (C1_) and the second copy pair includes a second copy (C2) and an inverted second copy (C2_).

In embodiments, the first set of logic gates 304A further includes a third XOR gate 308C to cross-compare the first copy pair and the second copy pair. For example, the third XOR gate 308C can compare either the first copy (C1) and the inverted second copy (C2_) or the inverted first copy (C1_) and the second copy (C2). In embodiments, the first set of logic gates 304 further includes an AND gate 312 to detect the error, e.g., an output from any of the comparisons of the XOR gates. Specifically, the AND gate 312 receives, as inputs, an output from the third XOR gate 308C and from one or more additional XOR gates, e.g., the first XOR gate 308A and the second XOR gate 308B, although additional XOR gates are envisioned for more granular or additional data checks.

In other embodiments, while not specifically illustrated, the third XOR gate 308C is replaced with a digital (or binary) comparator and the input to be compared are the first copy (C1) and the second copy (C2). In these embodiments, the AND gate 312 is to detect the error and receives as inputs, an output from digital comparator (represented in FIG. 3A as gate 308C) and from one or more XOR gates (e.g., the first and second XOR gates 308A and 308B.) Thus, the particular choice of logic gates can vary widely in order to perform a cross-comparison between copy pairs.

The comparison logic 300A can further include a first multiplexer 316A that receives a selection signal from the output of the second set of logic gates 304B and a second multiplexer 316B that receives a selection signal from the first set of logic gates 304A, e.g., from the AND gate 312. As illustrated, the output from each set of logic gates can be detected as a pass (P) or fail (F) of the comparison. The pass/fail value from each output will trigger the respective first and second multiplexers 316A and 316B to select between inputs. For the first multiplexer 316A, inputs include an 8-bit input <7:0> (that encodes valid data corresponding to C4) and an error code. If the selection signal from the second set of logic gates 304B is a fail, the multiplexer 316A selects the error value, else if the selection signal is a pass, the multiplexer 316A selects the C4 <7:0> input data. In embodiments, the second multiplexer 316B receives, as inputs, an output from the first multiplexer 316A and input data <7:0> (that encodes valid data corresponding to C2). Thus, the selection signal from the AND gate 312 can select the C2 data upon a check that passes, or selects the output from the first multiplexer 316A in response to a check that fails. The trim output from the second multiplexer 316B can provide the operational data to be loaded into the local media controller 135 or the error code if both checks resulted in an error (e.g., SE).

Figure 3B:
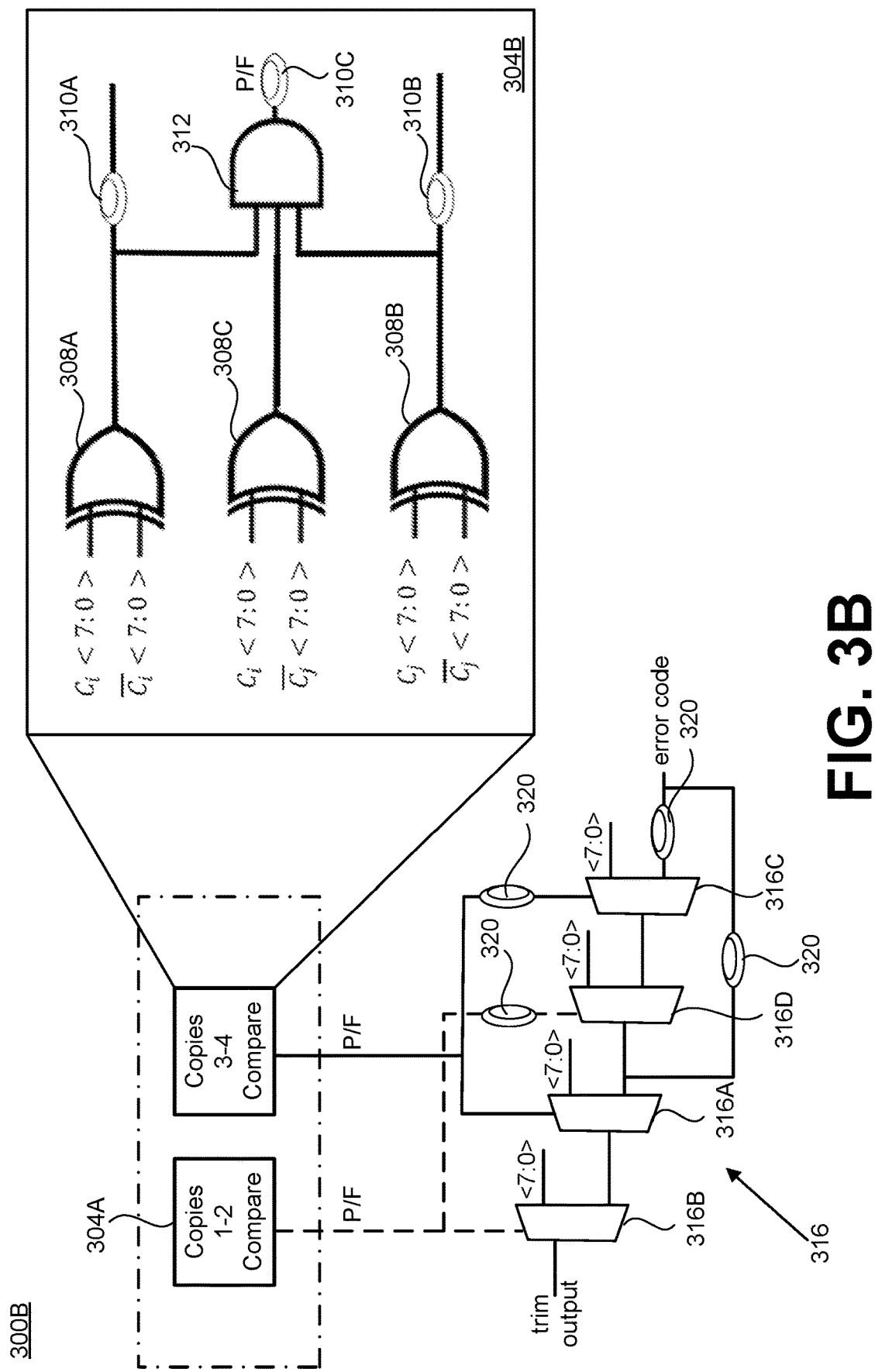
FIG. 3B is a block diagram of comparison logic for comparing copy pairs of operational data including an optional metal option for selective removal of the cross-comparing according to an embodiment.

FIG. 3B is a block diagram of comparison logic 300B for comparing copy pairs of operational data including an optional metal option for selective removal of the cross-comparing according to an embodiment. In some embodiments, the comparison logic 300B is included in the comparison logic 142 (FIG. 1A). While the comparison logic 300B is similar to the comparison logic 300A discussed with reference to FIG. 3A, the comparison logic 300B includes an additional metal option implementation. In these embodiments, the various metal lines may be implemented to include an optional path, e.g., possible connection changes via use of a physical mask or with different metal traces. In the illustrated example, the metal options may hard code the connections in circuitry or include switches that allow switching over to the cross-checking implementation after manufacturing.

In at least some embodiments, the comparison logic 300B includes a second set of logic gates 304B, which can be representative of the disclosed comparison logic 300B. A switch 310A may be coupled to an output of the first XOR gate 308A, a switch 310B may be coupled to an output of the second XOR gate 308B, and a switch 310C may be coupled to the output of the AND gate 312. These switches may be implemented as semiconductor or analog switches to selectively include a cross-comparing result between the first copy pair and the second copy pair, e.g., by selectively including the third XOR gate 308C and the AND gate 312 within the first set of logic gates 304A and/or within the second set of logic gates 304B. In some embodiments, the switches are each a transmission gate (TG). A TG is an analog gate similar to a relay that can conduct in both directions or block conductance by a control signal with almost any voltage potential.

In embodiments, these metal options can further be provided as a set of switches 320 within a set of multiplexers 316 that are triggered by the first and second sets of gates 304A and 304B. For example, in addition to the first multiplexer 316A and the second multiplexer 316B, the set of multiplexers 316 can include a third multiplexer 316C and a fourth multiplexer 316D coupled to the first and second sets of logic gates 304A and 304B, as illustrated. When the switch 310C is on and the cross-comparison is performed, multiplexers 316A and 316B are used. Further, the set of switches are configured or controlled in a way that the error code is directly connected to multiplexer 316A, making use of the third and fourth multiplexers 316C and 316D unnecessary.

In embodiments where the comparison logic 300B is switched back to excluding the cross-comparison of the copy pairs, the switch 310C is turned OFF while the switches 310A and 310B are turned ON. In these embodiments, multiplexers 316A-316D are connected to the PASS/FAIL signal of each comparison logic (e.g., c1/c1_, c2/c2_, c3/c3_, c4/c4_). The error code can be connected to the third multiplexer 316C while the switch 320 connecting the error code to first multiplexer 316A can be turned OFF.

Figure 3C:
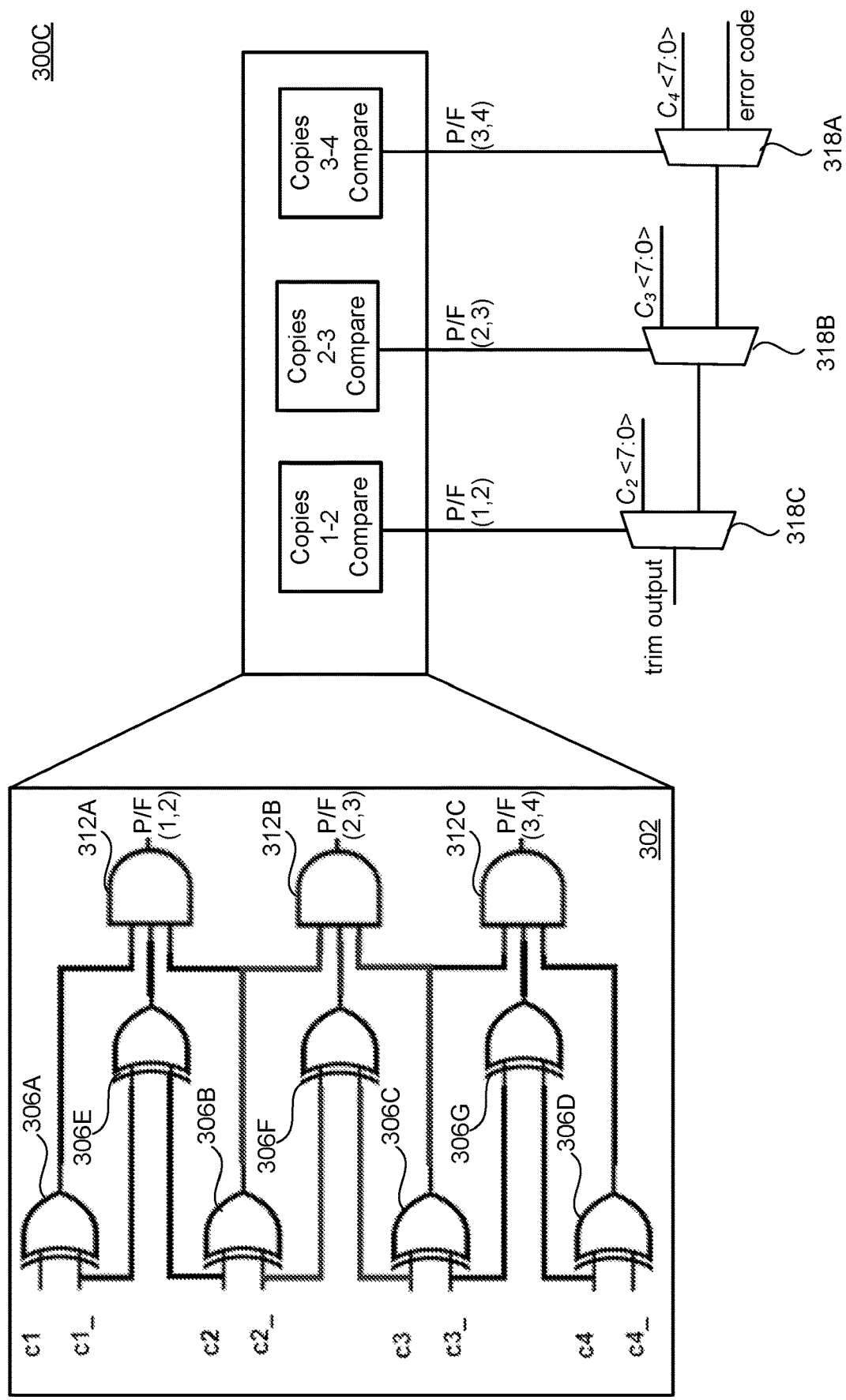
FIG. 3C is a block diagram of comparison logic for comparing copy pairs of operational data including cross-comparing between the copy pairs according to at least another embodiment.

FIG. 3C is a block diagram of comparison logic 300C for comparing copy pairs of operational data including cross-comparing between the copy pairs according to at least another embodiment. In some embodiments, the comparison logic 300C is included in the comparison logic 142 (FIG. 1A). In at least some embodiments, the comparison logic 300C is an extension of the comparison logic 300A of FIG. 3A, in providing an additional cross-comparison when comparing four copy pairs of operation data in parallel.

For example, in some embodiments, the comparison logic 300C includes a set of logic gates 302 with which to compare the four copy pairs and cross-compare the four copy pairs. In these embodiments, the set of logic gates 302 includes a series of XOR gates 306A-306D to perform copy pair comparisons. For example, a first XOR gate 306A compares a first copy pair (C1/C1_), a second XOR gate 306B compares a second copy pair (C2/C2_), a third XOR gate 306C compares a third copy pair (C3/C3_), and a fourth XOR gate 306D compares a fourth copy pair (C4/C4_).

In various embodiments, the set of logic gates 302 further includes a second series of XOR gates 306E-306G to perform cross-comparison between the four sets of copy pairs. For example, in some embodiments, a fifth XOR gate 306E compares a first inverted copy (C1_) and a second copy (C2) of the first and second copy pairs, a sixth XOR gate 306F compares an inverted second copy (C2_) with a third copy (C3) of the second and third copy pairs, and a seventh XOR gate 306G compares a third inverted copy (C3_) with a fourth copy (C4) of the third and fourth copy pairs. In an alternative embodiment (not illustrated), the fifth XOR gate 306E compares a first copy (C1) and an inverted second copy (C2_) of the first and second copy pairs, the sixth XOR gate 306F compares a second copy (C2) with a third inverted copy (C3_) of the second and third copy pairs, and the seventh XOR gate 306G compares a third copy (C3) with a fourth inverted copy (C4_) of the third and fourth copy pairs. Further, in still another embodiment, the second series of XOR gates 306E-306G are replaced with digital comparators (not illustrated) that cross-compare copies of the sets of copy pairs. More specifically, a first digital comparator would compare the first copy (C1) and the second copy (C2), a second digital comparator would compare the second copy (C2) with the third copy (C3), and a third digital comparator would compare the third copy (C3) with the fourth copy (C4). Thus, this disclosure illustrates multiple cross-comparison implementations.

In disclosed embodiments, the first set of logic gates 302 further includes a first AND gate 312A that receives, as inputs, the outputs from the first XOR gate 306A, from the second XOR gate 306B, and from the fifth XOR gate 306E, and outputs a pass signal if the XOR gate comparisons check matching data or a fail signal if any of the XOR gate comparison checks fail. In disclosed embodiments, the first set of logic gates 302 further includes a second AND gate 312B that receives, as inputs, the outputs from the second XOR gate 306B, from the third XOR gate 306C, and from the sixth XOR gate 306F, and outputs a pass signal if the XOR gate comparisons check matching data or a fail signal if any of the XOR gate comparison checks fail. In disclosed embodiments, the first set of logic gates 302 further includes a third AND gate 312C that receives, as inputs, the outputs from the third XOR gate 306C, from the fourth XOR gate 306D, and from the seventh XOR gate 306G, and outputs a pass signal if the XOR gate comparisons check matching data or a fail signal if any of the XOR gate comparison checks fail.

In at least some embodiments, the comparison logic 300C further includes a first multiplexer 318A that receives a selection signal from the output of the third AND gate 312C, a second multiplexer 318B that receives a selection signal from the output of the second AND gate 312B, and a third multiplexer 318C that receives a selection signal from the output of the first AND gate 312A. These multiplexers can be, in parallel and selected to pass certain data depending on whether there is a pass or fail. In embodiments, the first multiplexer 318A passes either an error code (if there is an error) or C4<7:0> operational data, the second multiplexer 318B passes either an output of the first multiplexer 318A (in case of a fail) or C3<7:0> operational data, and the third multiplexer 318C passes either an output of the second multiplexer 318B (in the case of a fail) or C2<7:0> operational data. The trim output by the third multiplexer 318C may therefore include data from a copy pair that has passed a check or the error code if each of the three selection signals indicate that the set of four copy pairs do not match, e.g., (C1/C1_ does not match C2/C2_, C2/C2_ does not match C3/C3_, and C3/C3_ does not match C4/C4_).

Figure 4:
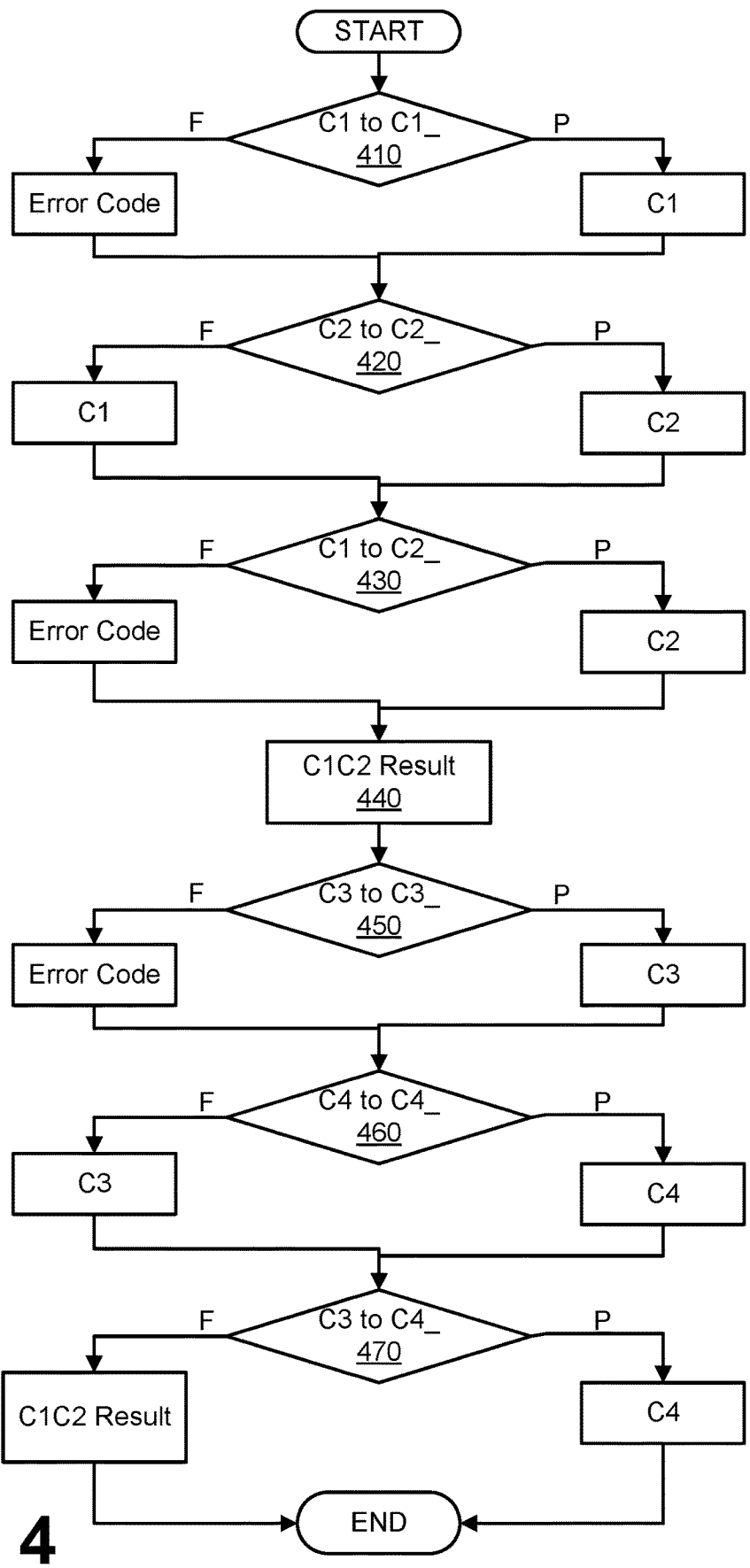
FIG. 4 is a flow chart of a method for comparing copy pairs of operational data including cross-comparing between the copy pairs according to various embodiments.

FIG. 4 is a flow chart of a method 400 for comparing copy pairs of operational data including cross-comparing between the copy pairs according to various embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the comparison logic 142 of FIG. 1A. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, a first copy pair is compared. More specifically, the processing logic compares a first copy (C1) to a first inverted copy (C1_). In response to a fail, an error code is passed and in response a pass, the first copy is passed along. The processing logic passes either the error code or the first copy to operation 420.

At operation 420, a second copy pair is compared. More specifically, the processing logic compares a second copy (C2) to a second inverted copy (C2_). In response to a fail, the first copy (C1) is passed and, in response to a pass, the second copy (C2) is passed along. The processing logic passes either the first copy or the second copy to operation 430.

At operation 430, a cross-comparison is performed between the first two copy pairs. More specifically, the processing logic compares the first copy (C1) to the second inverted copy (C2_), although this can also be performed with alternatives ones of the first two copy pairs as was previously discussed. In response to a fail, the error code is passed, and in response to a pass, the second copy is passed along. At operation 440, a result for comparing the first copy pair (C1/C1_) to the second copy pair (C2/C2_) is generated, referred to as the C1C2 result. More specifically, the processing logic passes this result (either the error code or C2 copy data) to operation 450.

At operation 450, a third copy pair is compared. More specifically, the processing logic compares a third copy (C3) to a third inverted copy (C3_). In response to a fail, the error code is passed, and in response to a pass, the third copy (C3) is passed along. The processing logic passes either the error code or the third copy, along with the C1C2 result, to operation 460.

At operation 460, a fourth copy pair is compared. More specifically, the processing logic compares a fourth copy (C4) to a fourth inverted copy (C4_). In response to a fail, the third copy (C3) is passed, and in response to a pass, the fourth copy (C4) is passed along. The processing logic passes either the third copy or the fourth copy, along with the C1C2 result, to operation 470.

At operation 470, a cross-comparison is performed between the second two copy pairs. More specifically, the processing logic compares the third copy (C3) to the fourth inverted copy (C4_), although this can also be performed with alternatives ones of the first two copy pairs as was previously discussed. In response to a fail, the C1C2 result (comparison of the first two copy pairs) is passed, and in response to a pass, the fourth copy (C4) is passed along. The processing logic thus outputs either the C1C2 result or the fourth copy.

Figure 5:
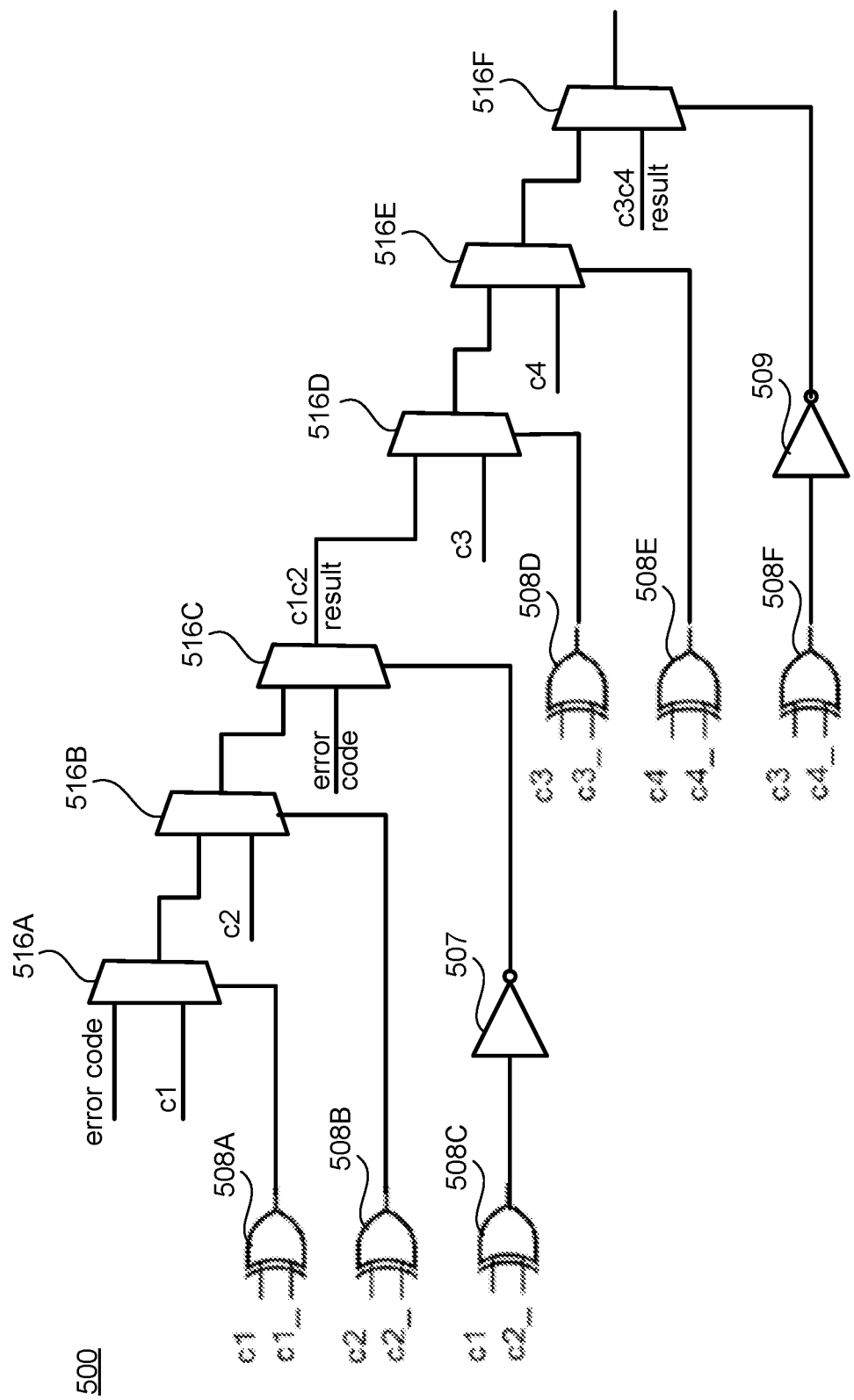
FIG. 5 is a block diagram of comparison logic for comparing copy pairs of operational data including cross-comparing between the copy pairs according to at least one embodiment.

FIG. 5 is a block diagram of comparison logic 500 for comparing copy pairs of operational data including cross-comparing between the copy pairs according to at least one embodiment. In some embodiments, the comparison logic 500 is included within the comparison logic 142 (FIG. 1A). In some embodiments, the comparison logic 500 is one way to implement the method 400 of FIG. 4. In embodiments, the comparison logic 500 includes a first XOR gate 508A to compare a first copy pair to include comparing a first copy (C1) with a first inverted copy (C1_), a second XOR gate 508B to compare a second copy pair to include comparing a second copy (C2) with an second inverted copy (C2_), and a third XOR gate 508C to cross-compare the first copy pair with the second copy pair. This cross-comparison can include comparing one copy of the first copy pair with one copy of the second copy pair, although only a single example of this is illustrated as comparing the first copy with the inverted second copy.

In some embodiments, the comparison logic 500 includes a first multiplexer 516A to receive, as inputs, an error code and the first copy (C1), a second multiplexer 516B to receive, as inputs, an output of the first multiplexer 516A and the second copy (C2), and a third multiplexer 516C to receive, as inputs, an output of the second multiplexer 516B and the error code. The comparison logic 500 can further include a logic gate (such as the third XOR gate 508C) to compare one copy of the first copy pair with one copy of the second copy pair. In embodiments, logic gate compares the first copy and the inverted second copy; or the inverted first copy and the second copy. In embodiments, an output of the first XOR gate 508A provides a selection signal to the first multiplexer 516A, the output of the second XOR gate 508B provides a selection signal to the second multiplexer 516B, and the output of the logic gate (e.g., the third XOR gate 508C), provides a selection signal to the third multiplexer 516C. In embodiments, the comparison logic 500 further includes an inverter 507 coupled between the output of the logic gate and the third multiplexer.

In embodiments, the comparison logic 500 includes a fourth XOR gate 508D to compare a third copy pair to include comparing a third copy (C3) with a third inverted copy (C3_), a fifth XOR gate 508E to compare a fourth copy pair to include comparing a fourth copy (C4) with an fourth inverted copy (C4_), and a sixth XOR gate 508C to cross-compare the third copy pair with the fourth copy pair. This cross-comparison can include comparing one copy of third copy pair with one copy of the fourth copy pair, although only a single example of this is illustrated as comparing the third copy with the inverted fourth copy.

In some embodiments, the comparison logic 500 further includes a fourth multiplexer 516D to receive, as inputs, an error code and the third copy (C1), a fifth multiplexer 516E to receive, as inputs, an output of the third multiplexer 516D and the second copy (C2), and a sixth multiplexer 516F to receive, as inputs, an output of the fourth multiplexer 516E and the error code. The comparison logic 500 can further include a second logic gate (such as the sixth XOR gate 508F) to compare one copy of the third copy pair with one copy of the fourth copy pair. In embodiments, the second logic gate compares the third copy and the inverted fourth copy or the inverted third copy and the fourth copy. In embodiments, an output of the third XOR gate 508D provides a selection signal to the third multiplexer 516D, the output of the fourth XOR gate 508D provides a selection signal to the fourth multiplexer 516D, and the output of the logic gate (e.g., the sixth XOR gate 508F), provides a selection signal to the sixth multiplexer 516F. In embodiments, the comparison logic 500 further includes an inverter 509 coupled between the output of the logic gate and the sixth multiplexer.

Figure 6A:
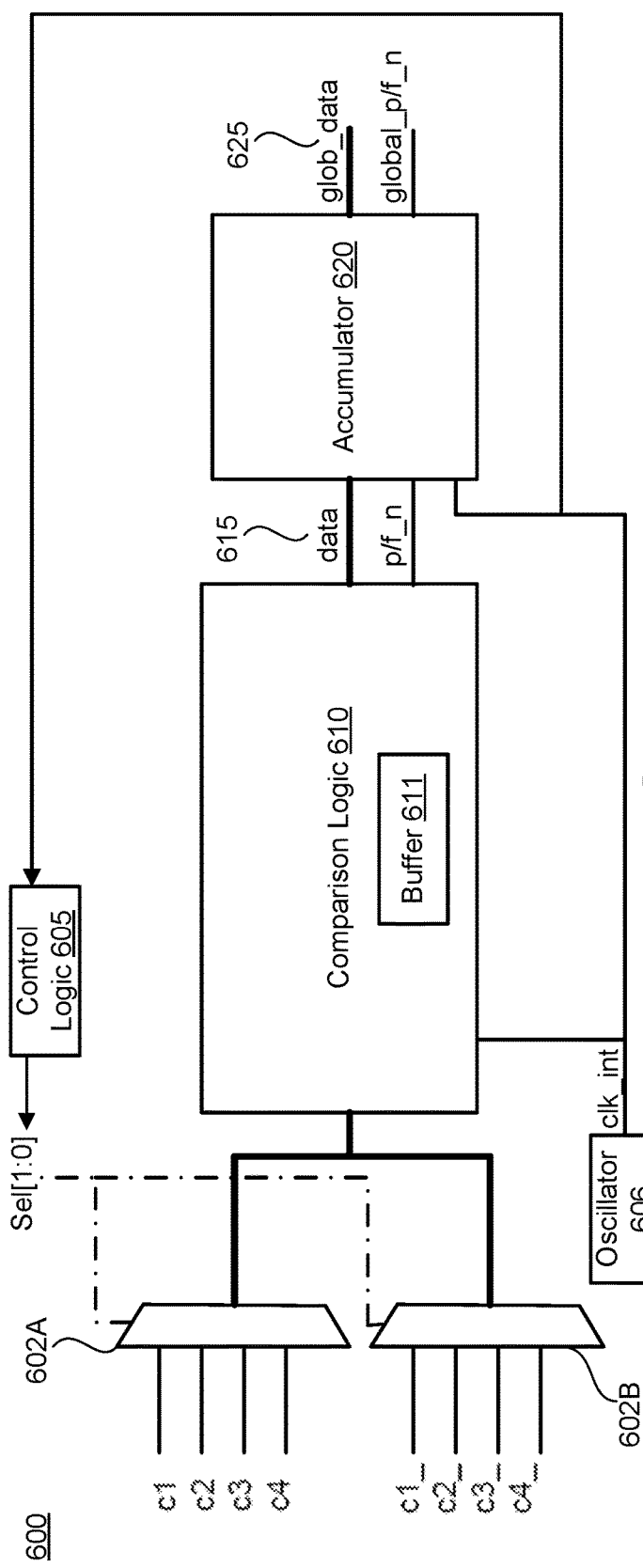
FIG. 6A is a block diagram of a data comparison architecture for sequentially comparing copy pairs that supports cross-comparing between the copy pairs according to an embodiment.
Figure 6B:
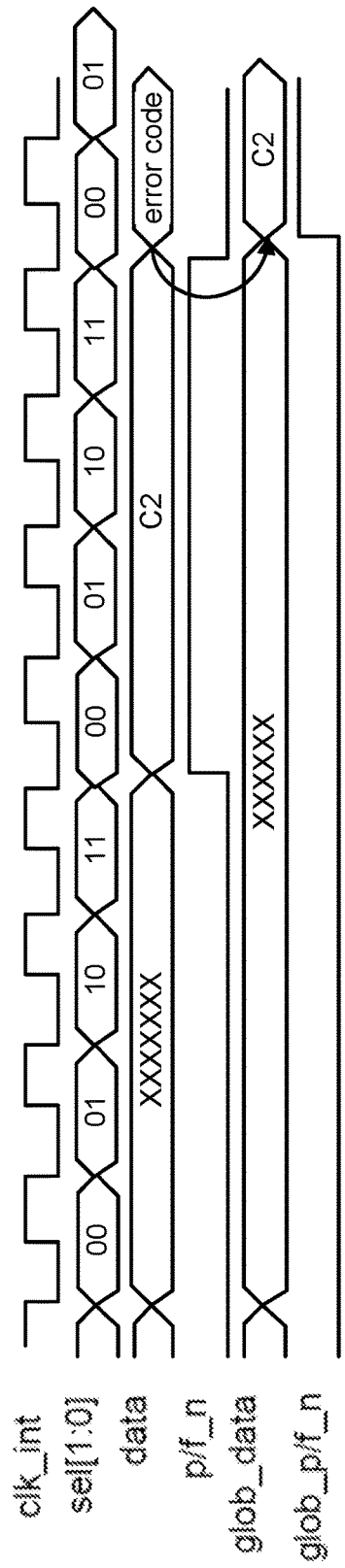
FIG. 6B is a graph with a set of plots illustrating the functionality of the data comparison architecture of FIG. 6A according to at least one embodiment.

FIG. 6A is a block diagram of a data comparison architecture 600 for sequentially comparing copy pairs that supports cross-comparing between the copy pairs according to an embodiment. In some embodiments, the data comparison architecture 600 at least partially includes the comparison logic 142 (FIG. 1A). FIG. 6B is a graph with a set of plots illustrating the functionality of the data comparison architecture 600 of FIG. 6A according to at least one embodiment. For ease of explanation, the copy pairs will be four in number, namely C1/C1_, C2/C2_, C3/C3_, and C4/C4_. The architecture 600, in various embodiments, includes a first multiplexer 602A to receive a plurality of copies of a portion of the operational data (e.g., C1-C4) and a second multiplexer 602B to receive a plurality of inverted copies of the portion (e.g., C1_-C4_), where the plurality of inverted copies are inverted versions of the plurality of copies.

In some embodiments, the architecture 600 further includes control logic 610 (also referred to as a data elaborator) coupled to selector inputs of the first multiplexer 602A and the second multiplexer 602B. In embodiments, the control logic 605 is configured to provide a selector signal (Sel[1:0]) that causes the first multiplexer 602A to output one of the plurality of copies and cause the second multiplexer 602B. to output one of the plurality of inverted copies. Thus, the selector signal can concurrently select a new copy pair for comparing. For example, if the selector signal is "00," then the multiplexers output the first copy pair (C1/C1_), if the selector signal is "01," then the multiplexers output the second copy pair (C2/C2_), if the selector signal is "10," then the multiplexers output the third copy pair (C3/C3_), and if the selector signal is "11," then the multiplexers output the fourth copy pair (C4/C4_). In alternative embodiments, the selection signal (Sel[1:0]) is a pair of two-bit signals that independently select one of the plurality of copies (C1 through C4) and one of the plurality of inverted copies (C1_ through C4_), and thus make it possible to perform all comparing of copy pairs without the need to buffer previously compared pairs of the copies/inverted copy pairs.

In embodiments, the architecture 600 further includes comparison logic 610 coupled with the first multiplexer 602A and the second multiplexer 602B. In these embodiments, the comparison logic 610 compares a copy of the plurality of copies received from the first multiplexer 602A with an inverted copy of the plurality of inverted copies received from the second multiplexer 602B. The comparison logic 610 may further output, on a data bus 615, the copy as output data and output (e.g., on the data bus 615 or a separate indicator line), a pass or fail indicator that corresponds to that copy. For example, the comparison logic 610 can output a pass indicator in response to the copy matching the inverted copy or output a fail indicator in response to the copy not matching the inverted copy.

In at least some embodiments, the comparison logic 610 further includes a buffer 611 or has access to cache or the like for temporarily storing the copies and inverted copies, as well as results of the comparing. Thus, in embodiments, the comparison logic 610 buffers previously compared pairs of a copy and an inverted copy. The comparison logic 610 can further cross-compare at least one buffered copy of the plurality of copies with a different-numbered inverted copy of the plurality of inverted copies and record one of a pass indicator or a fail indicator with each cross-compared pair of copies (or based on several cross-comparisons made). For example, the comparison logic 610 can compare one or more of C1 with C2_, C2 with C1_, C1 with C3_, C1_ with C3, C2 with C3_, C2_ with C3, C3 with C4_, C3_ with C4, and so forth. The buffer 611 can also enable the comparison logic 610 to buffer all of the plurality of copies and all of the plurality of inverted copies so that all of the copy pair comparisons and cross-comparisons can be performed and any known valid data passed to the data bus 615 along with a corresponding pass/fail indicator. In at least one embodiment, for example, the control logic 610 outputs, based on one or more cross-comparison, a known valid copy of the operational data and outputs the pass indicator based on availability of the known valid copy.

In various embodiments, the architecture 600 includes an oscillator 606 to generate an internal clock (clk_int). In these embodiments, the control logic 605 triggers a new one of the plurality of copies and of the plurality of inverted copies to be output from the first multiplexer and 602A second multiplexer 602B, respectively, at clock cycle transitions of the internal clock.

In at least some embodiments, the architecture 600 further includes an accumulator 620 coupled to the output of the accumulator 620, e.g., to the data bus 615, and includes a global data bus 625. In at least some embodiments, the accumulator 620 stores information identifying each respective copy and inverted copy that is compared along with one of the pass indicator or the fail indicator received from the comparison logic for each respective comparison. The accumulator 620 can buffer each copy of the plurality of copies that is compared by the comparison logic and output, as global data and after comparison of all copies of the plurality of copies, at least one copy of the plurality of copies and a global pass indicator or a global fail indicator.

In other embodiments where the comparison logic 610 aggregates copy pairs and pass/fail indicators for a portion of the operational data, the accumulator 620 stores any first valid data associated with a first plurality of cross-compared pairs of copies (e.g., associated with first through fourth copies) along with a corresponding one of the pass indicator or the fail indicator received from the comparison logic 610. The accumulator 620 can further store any second valid data associated with a second plurality of cross-compared pairs of copies (e.g., associated with fifth through eighth copies) along with a corresponding one of the pass indicator or the fail indicator received from the comparison logic. The accumulator 620 can further output, as global data on the global data bus 625, a combination of the any first valid data and the any second valid data and a corresponding global pass indicator or global fail indicator. A global fail indicator is only output if there is no previous valid check that passed the comparison for the plurality of cross-compared pairs of copies.

With additional reference to graph of FIG. 6B, the use of "XXXXX" in the data (and global data) plots indicates that not all of the copies and/or inverted copies have yet been compared by the comparison logic 610, and therefore corresponding operational data cannot yet be output. In the second set of selector signals (e.g., starting again at "00"), the second copy (C2) is output from the comparison logic 610 on the data bus 615 along with a "pass" indicator. The global data on the global data bus 625 has not yet been resolved until after the second set of selector signals. The comparisons performed by the comparison logic 610 result in an error at the third set of selector signals, and therefore, output the error code onto the data bus 615. Based on previously resolved valid data from the comparison logic 610, the accumulator 620 can output the second copy (C2) of operational data that was previously resolved as valid data.

Figure 7:
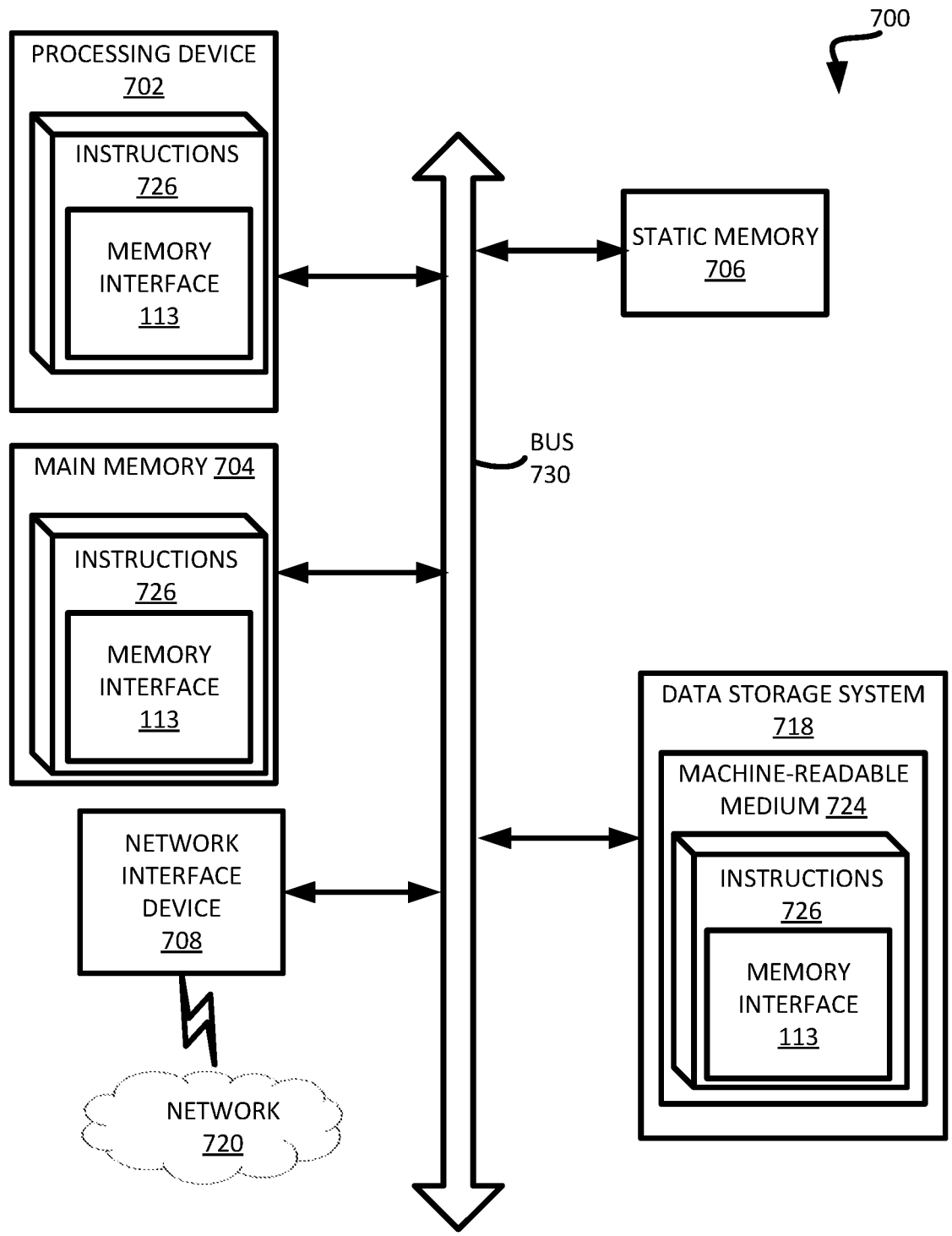
FIG. 7 is a block diagram of an example computer system in which embodiments of the present disclosure can operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1A) that includes, is coupled to, or utilizes a memory sub-system (e.g., the memory sub-system 110 of FIG. 1A). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIGS. 1A-1C.

In one embodiment, the instructions 726 include instructions to implement functionality corresponding to the memory interface 113 of FIG. 1A. While the machine-readable storage medium 724 is shown in an example embodiment to be a single medium, the term "non-transitory computer-readable storage medium" should be taken to include a single medium or multiple media that store the one or more sets of instructions. The term "machine-readable storage medium" or "computer-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory device comprising:
a local memory configured to store operational data; and
comparison logic operatively coupled with the local memory, wherein the comparison logic is configured to, upon initialization of the memory device:
compare, to detect any errors in the operational data, one copy of a first copy pair with one copy of a second copy pair of the operational data, the first copy pair comprising a first copy and an inverted first copy and the second copy pair comprising a second copy and an inverted second copy of the operational data; and
report an error in response to detecting the first copy pair does not match the second copy pair; and
wherein the comparison logic comprises:
an exclusive OR (XOR) gate to compare one of:
the first copy and the inverted second copy; or
the inverted first copy and the second copy; and
an AND gate to detect the error, the AND gate to receive, as inputs, an output from the XOR gate and from at least one of:
a second XOR gate that compares the first copy to the inverted first copy; or
a third XOR gate that compares the second copy to the inverted second copy.

2. The memory device of claim 1, wherein the comparison logic is further configured to:
perform an exclusive OR (XOR) of the first copy and the inverted first copy;
compare the first copy pair with the second copy pair comprising one of:
perform an XOR of the first copy and the inverted second copy; or
perform an XOR of the inverted first copy and the second copy; and
report the error in response to detecting one of:
the first copy does not match the inverted first copy;
the first copy does not match the inverted second copy; or
the inverted first copy does not match the second copy.

3. The memory device of claim 1, wherein the comparison logic further comprises a switch coupled to an output of the AND gate, the switch to selectively include a cross-comparing result between the first copy pair and the second copy pair.

4. The memory device of claim 1, wherein the comparison logic further comprises a multiplexer that receives, as inputs, the second copy and an error code and having a selection signal received from the AND gate.

5. The memory device of claim 1, wherein the comparison logic comprises:
   a digital comparator to compare the first copy and the second copy; and
   an AND gate to detect the error, the AND gate to receive, as inputs, an output from the digital comparator and from at least one of:
      a second XOR gate that compares the first copy to the inverted first copy; or
      a third XOR gate that compares the second copy to the inverted second copy.

6. The memory device of claim 1, wherein the comparison logic is further to:
   compare one of:
      the second copy and a third inverted copy of a third copy pair of the operational data; or
      the inverted second copy and a third copy of the third copy pair;
   report the error in response to detecting the first copy pair does not match the second copy pair or the second copy pair does not match to the third copy pair; and
   trigger loading the operational data into a local media controller of the memory device in response to detecting the first copy pair match the second copy pair or the second copy pair match the third copy pair.

7. The memory device of claim 1, wherein the comparison logic is further to:
   compare one of:
      a third copy of a third copy pair and an inverted fourth copy of a fourth copy pair of the operational data; or
      an inverted third copy of the third copy pair and a fourth copy of the fourth copy pair;
   report the error in response to detecting the first copy pair does not match the second copy pair or the third copy pair does not match the fourth copy pair; and
   trigger loading the operational data into a local media controller of the memory device in response to detecting the first copy pair match the second copy pair or the third copy pair match the fourth copy pair.

8. The memory device of claim 1, wherein the local memory comprises read-only memory (ROM).

9. A memory device comprising:
   a local memory configured to store operational data, which includes at least a first copy pair comprising a first copy and an inverted first copy and a second copy pair comprising a second copy and an inverted second copy; and
   comparison logic operatively coupled with the local memory, the comparison logic comprising:
      a first multiplexer configured to receive, as inputs, an error code and the first copy;
      a second multiplexer configured to receive, as inputs, an output of the first multiplexer and the second copy;
      a third multiplexer configured to receive, as inputs, an output of the second multiplexer and the error code; and
      a logic gate configured to compare one of the first copy pair with one of the second copy pair, wherein an output of the logic gate is configured to provide a selection signal to the third multiplexer.

10. The memory device of claim 9, wherein the logic gate is an exclusive OR (XOR) gate, further comprising an inverter coupled between the output of the logic gate and the third multiplexer.

11. The memory device of claim 9, wherein the logic gate is to compare one of:
   the first copy and the inverted second copy; or
   the inverted first copy and the second copy.

12. The memory device of claim 9, wherein the operational data further comprises a third copy pair having a third copy and an inverted third copy and a fourth copy pair having a fourth copy and a fourth inverted fourth copy, wherein the logic gate is a first logic gate, the memory device further comprising:
   a fourth multiplexer to receive, as inputs, an output of the third multiplexer and the third copy;
   a fifth multiplexer to receive, as inputs, an output of the fourth multiplexer and the fourth copy;
   a sixth multiplexer to receive, as inputs, an output of the fifth multiplexer and the output of the third multiplexer; and
   a second logic gate to compare one of third copy pair with one of the fourth copy pair, wherein an output of the second logic gate provides a selection signal to the sixth multiplexer.

13. The memory device of claim 12, wherein the second logic gate is an exclusive OR (XOR) gate, further comprising an inverter coupled between the output of the second logic gate and the sixth multiplexer.

14. The memory device of claim 12, wherein the second logic gate is to compare one of:
   the third copy and the inverted fourth copy; or
   the inverted third copy and the fourth copy.

15. A memory device comprising:
   a local memory configured to store operational data;
   a first multiplexer configured to receive a plurality of copies of a portion of the operational data;
   a second multiplexer configured to receive a plurality of inverted copies of the portion, the plurality of inverted copies being inverted versions of the plurality of copies;
   control logic coupled to selector inputs of the first multiplexer and the second multiplexer, the control logic configured to provide a selector signal that causes the first multiplexer to output one of the plurality of copies and cause the second multiplexer to output one of the plurality of inverted copies; and
   comparison logic coupled with the first multiplexer and the second multiplexer, the comparison logic configured to:
      compare a copy of the plurality of copies received from the first multiplexer with an inverted copy of the plurality of inverted copies received from the second multiplexer;
      output the copy as output data;
      output a pass indicator in response to the copy matching the inverted copy; and
      output a fail indicator in response to the copy not matching the inverted copy.

16. The memory device of claim 15, further comprising an oscillator to generate an internal clock, wherein the control logic is to trigger a new one of the plurality of copies and of the plurality of inverted copies to be output from the first multiplexer and second multiplexer, respectively, at clock cycle transitions of the internal clock.

17. The memory device of claim 15, wherein the comparison logic is further configured to:
buffer previously compared pairs of the copy and the inverted copy;
cross-compare at least one buffered copy of the plurality of copies with a different-numbered inverted copy of the plurality of inverted copies; and
record one of a pass indicator or a fail indicator with each cross-compared pair of copies.

18. The memory device of claim 17, wherein the comparison logic is further configured to:
output, based on results of the cross-comparison, a known valid copy of the operational data; and
output the pass indicator based on availability of the known valid copy.

19. The memory device of claim 17, further comprising an accumulator coupled to an output of the comparison logic, the accumulator to:
store any first valid data associated with a first plurality of cross-compared pairs of copies along with a corresponding one of the pass indicator or the fail indicator received from the comparison logic;
store any second valid data associated with a second plurality of cross-compared pairs of copies along with a corresponding one of the pass indicator or the fail indicator received from the comparison logic; and
output, as global data, a combination of the any first valid data and the any second valid data and one or more of a global pass indicator and a global fail indicator.

20. The memory device of claim 17, further comprising an accumulator coupled to an output of the comparison logic, the accumulator to:
store information identifying each respective copy and inverted copy that is compared along with one of the pass indicator or the fail indicator received from the comparison logic for each respective comparison;
buffer each copy of the plurality of copies that is compared by the comparison logic; and
output, as global data and after comparison of all copies of the plurality of copies, at least one copy of the plurality of copies and one of a global pass indicator or a global fail indicator.

* * * * *